March 17, 1942.                F. ALWARD                2,276,911
                          COMMUNICATING VALVE
                          Filed Oct. 13, 1941
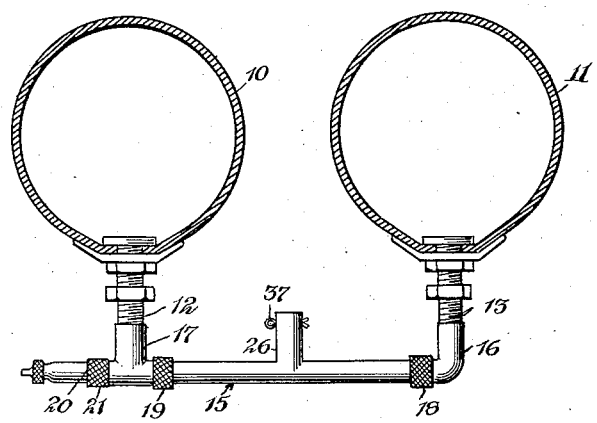
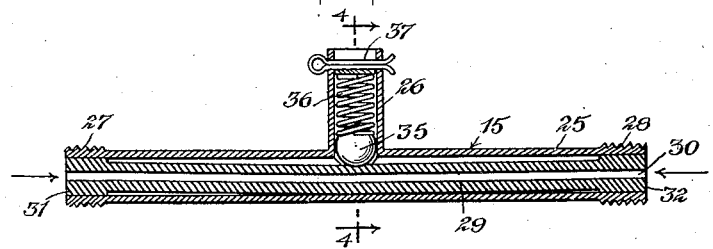
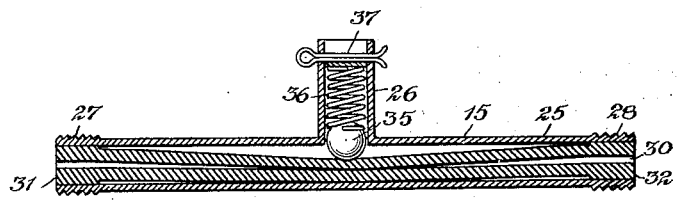
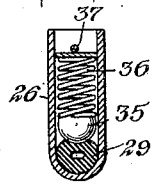
INVENTOR
Francis Alward
BY
ATTORNEYS
WITNESSES Patented Mar. 17, 1942

2,276,911

UNITED STATES PATENT OFFICE 2,276,911

COMMUNICATING VALVE

Francis Alward, Lexington, Mass.

Application October 13, 1941, Serial No. 414,753

7 Claims. (Cl. 152—429)

This invention relates to communicating valves, and more particularly to the type of valve adapted to be used between containers in which fluid is maintained under pressure and where it is desired to maintain equal pressure in each of the containers.

My invention is adapted for use between chemical tanks, air tanks, and many similar structures. Perhaps the greatest use to which my valve is adaptable is to the tires of dual wheel vehicles. A great many trucks and other vehicles are today provided with four wheels on the rear axle, and a great many trailers are provided with eight wheels, two on each end of each axle. This is particularly true at the present time in military transport where large loads must be carried over all types of roads and surfaces and it is desirable to spread the load over as much traction surface as possible.

Considerable difficulty is experienced with dual tires due to unequal pressures in the tires. Although tires may be originally filled with equal pressures, many factors tend to destroy this equilibrium and to cause pressure to build up in one tire whereby that tire will wear to a greater extent than the other. This may be caused by the unevenness of the roads, the use of the tires on a curved surface, and the fact that the brake drums, which are normally applied to but one wheel, build up heat causing expansion of the air in one of the tires. Numerous attempts have been made to maintain equal pressure but the devices now known are either inefficient or too costly for general use.

An object of this invention is to provide a communicating valve which will at all times under normal pressures maintain equal pressure in each tire, or where the valve is used with tanks equal pressure in each tank.

A further object is to provide a valve which will automatically close in the event that the air or fluid in one of the tanks or tires escapes.

A still further object is to provide a valve which will close when the air in one of the tires or the fluid in one of the tanks falls below a predetermined pressure to prevent the depletion of the pressure in the other tire or tank.

A further object is to provide a device of the character described in which the control pressure may be readily adjusted for varying circumstances.

As the description proceeds it will be seen that I have provided a simple but effective valve economical in construction and simply maintained or replaced.

In the drawing—

Fig. 1 is a plan view showing my communicating valve in position;

Fig. 2 is a sectional view showing the valve open;

Fig. 3 is a view similar to Fig. 2 but showing the valve closed;

Fig. 4 is a cross sectional view taken on the line 4—4 of Fig. 1.

For the purposes of describing the invention the members 10 and 11 shown in Fig. 1 may be assumed to be automobile tires having the usual valve stems 12 and 13.

The communicating valve unit 15 may be attached in any suitable manner, such as by connecting members 16 and 17 and the gland nuts 18 and 19. The members 16 and 17 may have a pin or boss to depress the tire valve or the tire valve may be removed entirely from the valve stems 12 and 13 and a single valve 20 of the conventional type connected to the member 17 by the gland nut 21.

In Fig. 1 I have shown merely one way of connecting my communicating valve, and it will be appreciated that it could be connected in any number of ways including a flexible connection made from flexible tubing. In some instances it may be desirable to use my valve in place of the standard valve. In single tires it would allow the escape of air when the pressures become too high and two of my valves may be used on dual tires in place of the standard valve and be connected by a piece of tubing.

My invention essentially resides in the communicating valve itself which in its simplest form may be made of an outer casing 25 preferably T shaped having a stem 26. The member 25 is threaded at 27 and 28 for connecting purposes. Within the tubing 25 is a piece of rubber tubing 29 having a narrow bore 30 therethrough. The tubing is preferably larger in diameter at the ends 31 and 32 and is cemented or banded to the outer tubing 25 at these points. Intermediate the ends 31 and 32 the tubing is slightly smaller in diameter so that it may give under pressure.

In the stem 26 of the T is mounted a ball 35 positioned and pressed downwardly by the spring 36 which is held in place by a cotter pin 37. It will be appreciated that the inner surface of the stem 26 may be threaded and an adjustable nut used in place of the cotter pin 37 if desired.

It will be understood that the pressure of the spring 36 is normally sufficient to press the ball 35 downwardly to close the bore 30 in the tubing 29 and to prevent the passage of air or fluid therethrough until pressure has been built up in the tanks or tires 10 and 11. The strength of the spring 36 will be determined by the use to which the valve is placed. Where the valve is to be used between dual tires in which the normal pressure, by way of illustration, would be 70 pounds in each tire, a spring exerting a force of slightly less than 70 pounds against the bore would be used. As long as the pressure in the tires—70 pounds—is greater than the pressure of the spring, the bore 30 would be kept open for the free passage of air therethrough. If due to heat or other causes the pressure in one tire would tend to build up, the pressure between both tires would be immediately equalized by the passage of air through the bore. On the other hand, if the tires were riding on an uneven surface, such as the shoulder of the road, where normally the pressure would be greatest on the inside tire, the pressure between the tires will equalize freely.

It will also be appreciated that in introducing air into the tires the air would be forced through the bore as soon as the pressure has overcome the strength of the spring. On the other hand, should one of the tires blow out, so as to release the pressure therein, the pressure in the other tire would not be sufficient to overcome the spring and the ball 35 would immediately close the bore 30 to prevent the escape of air from the sound tire. By the same token, if a slow leak developed in one tire, the spring will shut off the passage of air from the sound tire as soon as the pressure in the sound tire fell below the pressure of the spring.

In commercial practice different colored springs will be furnished for different strengths and the springs may be easily and quickly replaced or substituted by simply removing the cotter pin.

I claim:

1. In combination with dual pressure reservoirs a communicating valve therebetween, said valve comprising an elongated member, an elastic member having a bore extending through said elongated member and closing the ends thereof, a ball engaging said elastic member, and a spring exerting pressure on said ball.

2. In combination with dual pressure reservoirs a communicating valve therebetween, said valve including an elongated member, a tubing extending through said elongated member and sealing the ends thereof, a bore in said elongated member, and means for exerting a predetermined pressure on said tubing intermediate its ends.

3. In combination with dual pressure chambers a communicating valve therebetween, said valve including a rigid elongated member, a flexible member within said elongated member, a bore in said flexible member extending therethrough, and means for exerting a predetermined pressure against said flexible member tending to close said bore when the pressure in said reservoir falls below a predetermined point.

4. In combination with dual pressure chambers a communicating valve therebetween, said valve including a T shaped outer casing, flexible tubing in the transverse portion of said casing, a bore through said flexible tubing, a ball in the stem of said casing, and a spring in said stem exerting pressure against said ball forcing said ball against said flexible tubing tending to close said bore.

5. In combination with dual tires, a communicating valve therebetween, said valve including a flexible tubing, a bore in said tubing, and means for exerting a predetermined pressure against said tubing to close said bore when the pressure in said tires falls below a predetermined point.

6. In combination with dual tires, a communicating valve therebetween, flexible tubing in said valve, a bore through said tubing, a ball engaging the outer surface of said flexible tubing, and a spring for maintaining a predetermined pressure against said ball to force said ball against said tubing to close said bore when the pressure in said tires and said bore falls below a predetermined point.

7. In combination with a plurality of pressure chambers, a communicating valve therebetween, said valve including a flexible tubing, a bore in said tubing, and means for exerting a predetermined pressure against said tubing to close said bore when the pressure in said chambers falls below a predetermined point.

FRANCIS ALWARD.